(12) United States Patent
Bacchiaz et al.

(10) Patent No.: US 8,307,207 B2
(45) Date of Patent: Nov. 6, 2012

(54) BIOMETRIC KEY

(75) Inventors: John David Bacchiaz, Queensland (AU); Andrej Pajnič, Preserje (SI); Tomaž Žepič, Ljubljana (SI); Boštjan Podlipec, Log pri Brezovici (SI)

(73) Assignee: Mu Hua Investments Ltd., Hong Kong (HK)

( * ) Notice: Subject to any disclaimer, the term of this patent is extended or adjusted under 35 U.S.C. 154(b) by 0 days.

(21) Appl. No.: 13/167,904

(22) Filed: Jun. 24, 2011

(65) Prior Publication Data

US 2012/0079273 A1    Mar. 29, 2012

(30) Foreign Application Priority Data

Sep. 28, 2010   (AU) ................. 2010224455

(51) Int. Cl.
*H04L 29/06*    (2006.01)
(52) U.S. Cl. ............ 713/168; 713/150; 713/185; 726/2; 726/9; 726/20
(58) Field of Classification Search .......... 726/9, 20; 713/186
See application file for complete search history.

(56) References Cited

U.S. PATENT DOCUMENTS

| | | | | |
|---|---|---|---|---|
| 5,055,658 A * | 10/1991 | Cockburn | ................ | 235/382 |
| 5,245,329 A * | 9/1993 | Gokcebay | ................ | 340/5.33 |
| 5,815,252 A * | 9/1998 | Price-Francis | ................ | 356/71 |
| 5,892,902 A * | 4/1999 | Clark | ................ | 726/5 |
| 6,041,410 A * | 3/2000 | Hsu et al. | ................ | 713/186 |
| 6,044,349 A * | 3/2000 | Tolopka et al. | ................ | 705/1.1 |
| 6,078,265 A * | 6/2000 | Bonder et al. | ................ | 340/5.23 |
| 6,091,835 A * | 7/2000 | Smithies et al. | ................ | 382/115 |
| 6,957,336 B2 * | 10/2005 | Wheeler et al. | ................ | 713/176 |
| 6,983,368 B2 * | 1/2006 | Wheeler et al. | ................ | 713/170 |
| 6,990,587 B2 * | 1/2006 | Willins et al. | ................ | 713/182 |
| 7,218,202 B2 * | 5/2007 | Bacchiaz et al. | ................ | 340/5.52 |
| 7,305,563 B2 * | 12/2007 | Bacchiaz et al. | ................ | 713/186 |
| 2002/0059523 A1 * | 5/2002 | Bacchiaz et al. | ................ | 713/200 |
| 2003/0028814 A1 * | 2/2003 | Carta et al. | ................ | 713/202 |
| 2005/0182947 A1 * | 8/2005 | Bacchiaz et al. | ................ | 713/186 |
| 2006/0085844 A1 * | 4/2006 | Buer et al. | ................ | 726/4 |
| 2006/0170530 A1 | 8/2006 | Nwosu et al. | | |
| 2007/0094721 A1 * | 4/2007 | Nguyen et al. | ................ | 726/9 |
| 2007/0157290 A1 * | 7/2007 | Crawford | ................ | 726/3 |
| 2007/0220272 A1 | 9/2007 | Campisi et al. | | |
| 2008/0052528 A1 | 2/2008 | Poo et al. | | |
| 2009/0150994 A1 * | 6/2009 | Evans | ................ | 726/20 |
| 2010/0085150 A1 * | 4/2010 | Aikawa et al. | ................ | 340/5.82 |

OTHER PUBLICATIONS http://en.wikipedia.org/wiki/Public_key_infrastructure, 4 pages, printed: Jun. 22, 2011.
http://en.wikipedia.org/wiki/Symmmetric_key_algorithm, 2 pages, printed: Jun. 22, 2011.

(Continued)

*Primary Examiner* — Ponnoreay Pich
(74) *Attorney, Agent, or Firm* — Akerman Senterfitt (57) ABSTRACT

A biometric key (10) which has an interface or electrical connection to a receptor body (11) which functions as an external power source a biometric sensor, a CPU, a nonvolatile memory unit incorporating a database of authorized biometric signatures or biocodes along with associated firmware required for comparison between data received from the biometric sensor and to provide acceptance or rejection of said data upon electrical connection to the receptor body (11) whereby a signal is sent to a facility (12, 13, 15, 16, 17) accessible by the key (10) advising of said acceptance or rejection.

12 Claims, 5 Drawing Sheets

OTHER PUBLICATIONS

Kessler, Gary C., "An Overview of Cryptography", May 22, 2011, 44 pages, copyright: May 22, 2011.
http://devzone.zend.com/article/1265-Encryption-and-Decryption-using-PHP-and-GnuPG, 6 pages, printed; Jun. 22, 2011.
http://ieeeplore.ieee.org/search/freesrchabstract.jsp?tp=&arnumber=5233985&queryText%3D5233985%26openedRefinements%3D*%26searchField%3DSearch+All, 1 page, printed Jun. 22, 2011.
http://en.wikipedia.org/wiki/Elliptic_curve_cryptography, 7 pages, printed: Jun. 22, 2011.
http://en.wikipedia.org/wiki/Advanced_Encryption_Standard, 9 pages, printed Jun. 22, 2011.

* cited by examiner

BIOMETRIC KEY

CROSS-REFERENCE TO RELATED APPLICATIONS

This application claims benefit from Australian Patent Application No. 2010224455 filed on Sep. 28, 2010, the disclosure of which is incorporated into the present application by reference.

FIELD OF THE INVENTION

This invention relates to a key incorporating a biometric sensor which when inserted into a receptor body forwards a signal representing a biocode of data generated by the biometric sensor to processing means for granting access to an authorised user to a facility accessible by the biometric key.

BACKGROUND TO THE INVENTION

Biometric keys of the type described above are known in U.S. Pat. Nos. 7,218,202 and 7,305,563.

U.S. Pat. No. 7,218,202 refers to a biometric key having electrical contacts which mate with corresponding contacts in the receptor body to automatically generate the signal. In this regard the signal was forwarded to a processing unit which was located externally of the biometric key and which could be interfaced with or electrically connected to the receptor body. The external processing unit contained a database to permit access to a facility after matching of the biocode permitted validation of the biocode. In other words if the biocode referred to an authorised biometric signature on the database, then access to the facility was provided. The external processing unit could also be interfaced with a host computer for enrolment of authorised biocodes or biometric data.

Reference may also be made to U.S. Pat. No. 7,305,563 which described a biometric key similar to what is described above in relation to U.S. Pat. No. 7,218,202 with the additional feature that the biometric key could be received in a receptor body in either of two configurations. This was achieved by the key having a key circuit having a power supply circuit and a communications circuit and the key having a plurality of electrical contacts wherein at least two of the electrical contacts were in electrical communication with the power supply circuit and the communications circuit also being in electrical communication with said at least two contacts. This enabled the said at least two contacts to transmit and receive data which enabled the key to be received in the receptor body in either of the two configurations i.e. one configuration being at 180° to the other configuration. In this reference the receptor body also included a microprocessor and the key also incorporated a microprocessor.

Reference also may be made to U.S. Pat. No. 6,078,265 which describes a key-lock operated security system similar to that described in U.S. Pat. No. 7,218,202 wherein use is made of an intelligent key having a scanner, microcontroller and memory so that the scanner can scan fingerprints and compare the resulting biocode with a database of authorized users of the security system stored in the memory.

However one of the problems of conventional technology as described above occurs when the biometric key is interfaced with or electrically connected to the processing unit which in turn had to be interfaced with a host computer for enrolment purposes. Also the authorized biometric signature was transferred to the external processing unit for inclusion in the database during general use. This was the case with U.S. Pat. Nos. 7,218,202 and 7,305,563. Thus it is possible for the processing unit or host computer to be reconfigured or reprogrammed to function in ways not facilitated by the owner, administrator or designer. This practice is commonly called "hacking" and allows an unauthorised person to obtain access to the host computer or processing unit and obtain information which could then be used for illegal procedures such as criminal activities including fraud and robbery.

U.S. Pat. No. 6,078,265 suffered from a similar problem wherein enrolment or changes to the database could only be carried out by a separate key programming device having a key receptacle for insertion of the intelligent key, a microprocessor, a memory and a scanner for validating the programmer operator. Also the authorized biometric signature was also transferred to a key-lock controller during general use. Again it was possible for "hacking" to occur through the key programming device or key-lock controller.

The activities of "hackers" as described above can result in criminal exploitation of the Internet and loss of privacy when confidential information is lost or intercepted and thus can be used to the detriment of the owner of the confidential information. Thus a variety of computer crimes or "cybercrimes" can occur which include fraud or misrepresentation.

It is therefore an object of the invention to provide a biometric key which may alleviate or eliminate the problems of the prior art as described above.

The invention therefore in one aspect includes a biometric key which has an interface or electrical connection to a receptor body which functions as an external power source, a biometric sensor, a central processing unit ("CPU"), a non-volatile memory unit incorporating a database of authorised biometric signatures along with associated firmware required for comparison between data received from the biometric sensor and to provide acceptance or rejection of said data upon electrical connection to said receptor body whereby a signal is sent to a facility accessible by the key advising of said acceptance or rejection characterized in that during use an authorized biometric signature is not transferred to any external computer or processor.

The CPU is suitably a printed circuit board which has a plurality of integrated circuits and an associated microprocessor which controls the functions of the nonvolatile memory unit and firmware described above.

The invention also provides a process for providing access to a facility which includes the steps of:
(i) providing connection between a biometric key which incorporates a biometric sensor and a receptor body which provides electric power to the key while simultaneously activating the biometric sensor;
(ii) establishing a security code in relation to communications between the biometric key and a server;
(iii) comparing a biocode received from the biometric sensor with a database located in the biometric key to determine whether said biocode is located in said database and thus corresponds to an authorised biometric signature; and
(iv) upon a match and/or no match being made between said data and said database in relation to said authorised biometric signature forwarding a signal to the facility advising of acceptance or rejection of said data in regard to providing access to the facility whereby during steps (i), (ii), (iii) and (iv) said authorized biometric signature is not transferred to any external computer or processor.

It is important to stress that in comparison with the prior art, the biometric key of the invention during use has an authorized signature retained within the non-volatile memory of the key which is not transferred to any external computer or processor. This is clearly shown for example in FIG. 4 herein for enrolment of a new user and in FIGS. 2-3 herein showing general use of the biometric key and its interaction with the server. This means that the biometric key is the sole source of identification of the user and also that enrolment of a new user takes place without any transfer of the authorized signature to an external processor. This avoids "hacking" as no information relevant to the user is transferred to an external processor during use. The only signal sent to a facility for accessing the facility is in the form of a YES/NO message.

The interaction between the biometric key and the receptor body may, for forwarding of the signal to the facility involve the use of electrical contacts, wherein the key body has one or more contacts which touch mating contact(s) of the receptor body. An example of such an arrangement is shown in FIGS. 11 and 12 of U.S. Pat. No. 7,305,563 which is also incorporated herein by reference. A suitable receptor body is also found in FIG. 13 of U.S. Pat. No. 7,305,563. However, such interaction may also involve a transmitter of the key interacting with a receiver of the receptor body and such interaction may be of an optical, infra-red, radio-frequency or fiber-optic nature.

The key body may be similar to a conventional key which unlocks mechanical locks wherein the key has a blade with a plurality of wards that co-operate with lock tumblers in a conventional manner to unlock the mechanical lock as hereinafter described. The key body may also have a handle or gripping part, which may have the biometric sensor attached thereto or embedded therein. Preferably the sensor is accommodated within a mating recess of the key body and is provided with contacts or pins forming one example of the contact means which may engage with a circuit board also accommodated within the key body. Preferably the sensor is surrounded by an insulator insert and this may be achieved as shown in U.S. Pat. No. 7,218,202 which is incorporated herein by reference.

Alternatively the key body may omit wards and have a blade or end portion, which engages with a mating slot in the receptor body. In this embodiment the receptor body may interface with the microprocessor located in the biometric key, whereby upon recognition of a signal representing an authorised biocode from the user access to the facility may be provided.

It will also be appreciated that the key may also in the form of a security card which has attached thereto or embedded therein a biometric sensor. Such a security card may engage with a slot in the receptor body as described above. Thus the term "biometric key" as used herein means any device which incorporates a biometric sensor that may be interfaced or makes electrical connection with a receptor body.

The sensor may be a solid state sensor manufactured by biometric sensors manufacturer (i.e. STMicroelectronics) and the sensor may scan an appropriate biometric characteristic of the key holder. The scanning sensor may be carried out using a number of techniques which may include capacitance, resistance, thermal imagery, structure geometry, bone structure and vein structure. Suitably the scanning sensor scans a fingerprint or thumb print.

The biometric key may also have embedded therein a smart card chip such as a wired logic chip also known as an "intelligent memory" chip, which has inbuilt logic.

Embedded processor chips, added to the key body, may contain memory and local processor capabilities. The embedded processor chip, embedded within the key body, may be used to encrypt/decrypt data, which makes this type of biometric key a unique identification key.

Examples of use of the biometric key of the invention may be as an ignition key of a vehicle, a key to a storage facility such as a drawer or lid of a box, a security facility such as a security door or security window, to operate an elevator or lift or to initiate actuation of an electric motor, hydraulic motor, engine or other form of drive means or even hydraulic or pneumatically actuated ram assemblies. Another example of a facility may include a bank having financial information or funds or a facility incorporating information concerning immigrants or customs information. Each of the foregoing are examples of facilities which may be accessible by the biometric key of the invention.

PREFERRED EMBODIMENTS

Reference may be made to a preferred embodiment of the invention as shown in the drawings attached hereto wherein.

Figure 1:
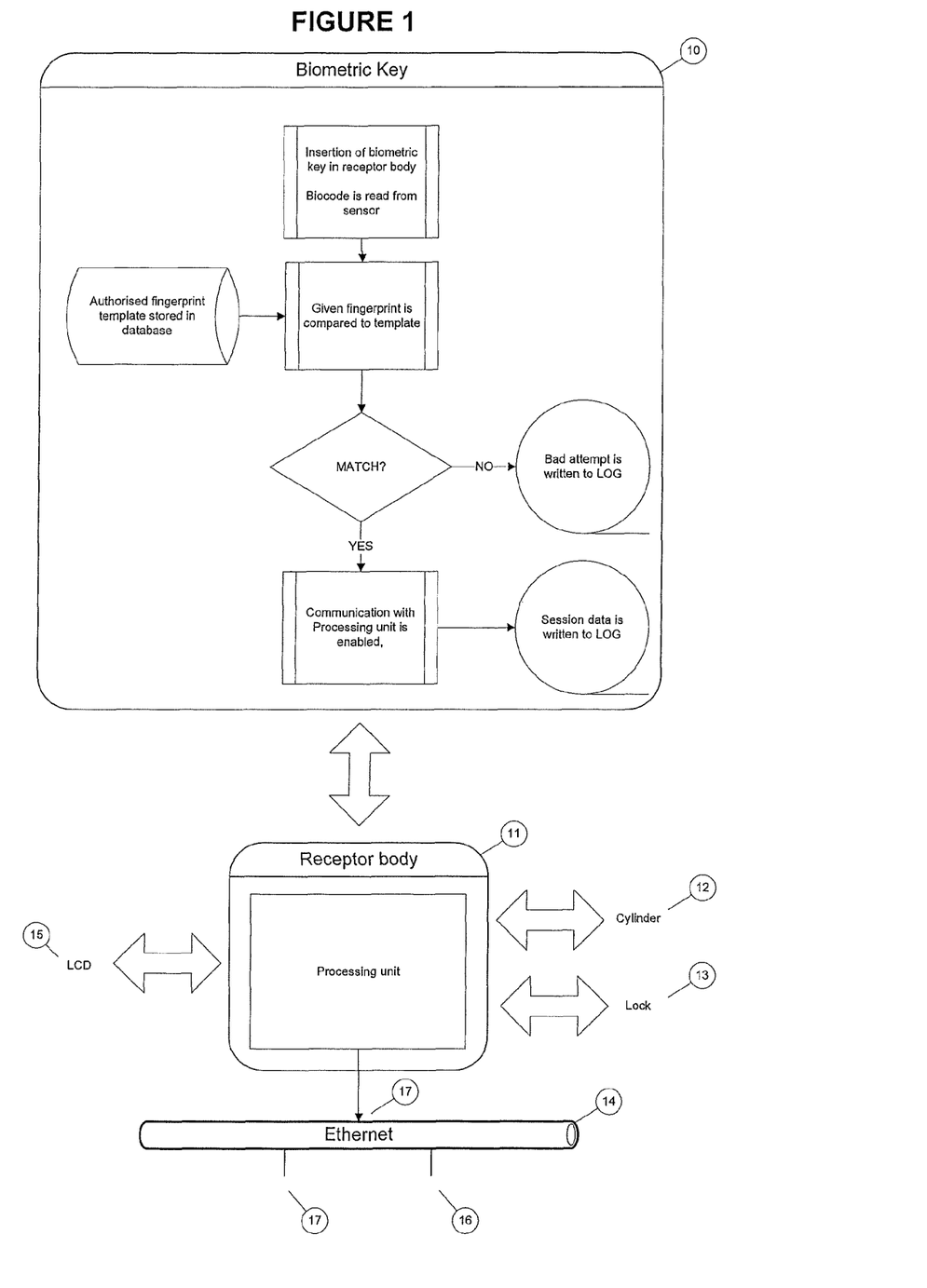
FIG. 1 is a schematic flow chart which represents the process of the invention.

In FIG. 1 it will be noted that flow sheet refers to the initial step of inserting the biometric key 10 into the receptor body or processing unit 11 wherein data or a biocode is read from the key 10 which is then compared with a database or template which has a single authorised template or a plurality of authorised templates and when a match is achieved communication with the receptor body or processing unit 11 is enabled which enables a "YES" or "NO" message to be sent from receptor body or processing unit 11 to a facility which may be a lock cylinder 12, lock 13 or transmitted over the Ethernet 14 to a remote location to access a facility such a s bank vault 16 or a server 17. The signal 17 may be shown on a display device 15 such as an LCD which may be part of the receptor body 11 or may be part of the facility being accessed. It is important to stress that the key 10 may be the form of a PC which may contain onboard volatile and nonvolatile memory, communications interface with receptor body 11, fingerprint recognition software or firmware and database manager all integrated into key 10.

The biometric key (10) captures and extracts a biocode which may be for example be a map of a fingerprint or digital signature that permits identity verification of a person. The extraction and matching algorithm is based upon live minutia comparison and in this regard one algorithm called Spectrum Analysis which has been developed by a Japan based company DDS has been useful. This algorithm evaluates the finger print through horizontal slices. Another technology in the form of a fingerprint recognition algorithm called "Shading" may be used. Currently minutia-based algorithm extract information such a ridge ending, bifurcation and short ridge from a fingerprint image.

It will be noted from FIG. 1 that the receptor body 11 or processing unit 11 may be in the form of a door unit, a desktop unit or a biometric key authorisation unit. A door unit is inserted into a doorframe and controls opening or closing of a lock of a door enclosed by the doorframe. A biometric key authorisation unit is an authorisation device used in an enrolment procedure as described hereinafter, which is powered over a network and has a visual display. A desktop unit is similar to a biometric key authorisation unit but without the display device.

Another example of a receptor body is a mobile phone or a cell phone, wherein a biometric Key 10 is inserted into a corresponding slot and uses the battery which powers the mobile phone or cell phone as the external power source to provide power to key 10.

There also may be provided a communication method between a biometric key as described above, and a server which includes the following steps:
(i) making electrical connection between a biometric key as described above having a biometric sensor and a receptor body thereby making communication with a server wherein the biometric key has a public key and a private key and the server also has a public key and a private key wherein the server will identify the biometric key upon making such electrical connection;
(ii) establishing a security code for communication between the biometric key and the server wherein said security code will be encrypted with the biometric key's public key and sent to the biometric key for decryption by the private key of the biometric key and said security code will be encrypted with the server's public key and sent to the server for decryption by the server's private key;
(iii) establishing using the security code and procedure in step (ii) that the biometric key is authorised to access a facility or to use the receptor body and if such authorisation is present a biocode such as a fingerprint of a user of the biometric key will subsequently be compared to a database located in the biometric key and if a match is obtained a communication from the biometric key using the security code and procedure in step (ii) will be sent to the server wherein access to a facility accessible by the server will be provided.

In this regard in a preferred embodiment of this method the biometric key may be provided with a unique serial number that may for example be hard wired into the biometric key and there also may be provided a unique identification number associated with the biometric key which may be registered with a database associated with the server. The receptor body may also be provided with a serial number and the facility being accessed may also be provided with a serial number. This preferred embodiment may include the following additional steps:
(iv) in step (i) the identification number is sent to the server using the security code and procedure set out in step (ii) whereupon following decryption by the server the server may then ascertain which biometric key has electrical communication with or has been inserted into the receptor body;
(v) simultaneously with step (iv) the server will generate the security code for symmetrical encryption and this new symmetrical key will be encrypted with the biometric key's public key and sent to the biometric key whereby the new symmetrical key will only be used in communication between the server and the biometric key;
(vi) after generation of the symmetrical key the server checks if the biometric key is authorised to access a facility interfaced with the server or the receptor body;
(vii) if the biometric key does not have such authorisation the server will encrypt NO message which for example can be the ID number of the biometric key encrypted with the symmetrical key and send this information to the biometric key or if the biometric key does have such authorisation the server will encrypt YES message which can for example be the serial number of the biometric key encrypted with the symmetrical key and send this information to the biometric key;
(viii) upon sending the information set out in (vii) the server will send further information including a timestamp and then a facility serial number or serial number of the receptor body to the biometric key;
(ix) subsequently the biometric key will process the further information and if use of the biometric key is not authorised or wrongly used this will be written into a LOG of the biometric key and into a LOG on the server both together with a timestamp and the facility/receptor body serial number;
(x) after waiting a period of time, the user fingerprint is also verified and if:
    (a) it is not authorised and thus requires a NO message; or
    (b) it is authorised and thus requires YES message, a YES/NO message encrypted with the symmetrical key is sent to the server and together with the timestamp and the serial number of the receptor body or facility is written into the LOG of the biometric key and also the server; and
(xi) upon receipt of the YES message, the server will then open or make the facility associated with the server or receptor body accessible to the biometric key;

In relation to step (i) it is important to stress that the biometric key is provided with a public key from the server and the server will have a public key for each biometric key. The term "public key" as used herein will mean a public key associated with Public Key Infrastructure ("PKI") which is described at hxxp://en.wikipediaiwiki/Public_key_infrastructure. In cryptography a PKI is an arrangement that binds public keys with respective user identities by means of a Certificate Authority ("CA"). The user identity must be unique with each CA domain.

It will also be appreciated that the term "private key" from PKI refers to a private or secret key which is used to decrypt encrypted communications. Thus from PKI a public key and private key are generated simultaneously using the same algorithm. The private key is never published or shared with anyone or sent across the Internet.

In relation to a variation of the steps (i) to (xi) as set out above, it is of course possible to only use the serial number of the biometric key instead of the identification number to identify the biometric key which has had electrical communication with or has been inserted into the receptor body. In this arrangement, the serial number can be compared to a database of serial numbers associated with the server. Also in this arrangement only one message is required to check whether the biometric key is authorised for a particular facility or receptor body i.e. encryption of the serial number of the biometric key with the SK which is then sent to the biometric key.

It is also important to stress that in this preferred embodiment a secure path has been provided between the biometric key and the server. Thus messages between the biometric key and the server is encrypted with the public key of the server and only the server, who has its own private key can decrypt the message. At the same time, when the server sends a message to the biometric key it will use the biometric key's public key, encrypt it and send the message over the communication path between the server and the biometric key. The biometric key will then decrypt this message with its own private key which is not available anywhere except in the nonvolatile memory of the biometric key. The actual private and public keys are generated at startup of the CA on the server for the server and on the biometric key for the biometric key and at this time the user of the biometric key is authorised to use the biometric key with the help of the receptor body and the biometric key is authorised with the server by means of exchanging the public keys. However when the serial number or identification number of the biometric key is encrypted with server's public key and sent to the server and the newly generated symmetrical key encrypted with biometric key's public key is sent back to the biometric key, then all the messages between the biometric key and the server in that session are encrypted with a symmetrical key algorithm as described at hxxp://en.wikipedia.org/wiki/symmetric_key_algorithm and therefore is totally secure. In regard to FIG. 2, step (A) concerns insertion of the biometric key into the receptor body which is one example of establishing an interface or establishing electrical connection between the biometric key and the receptor body.

Figure 2:
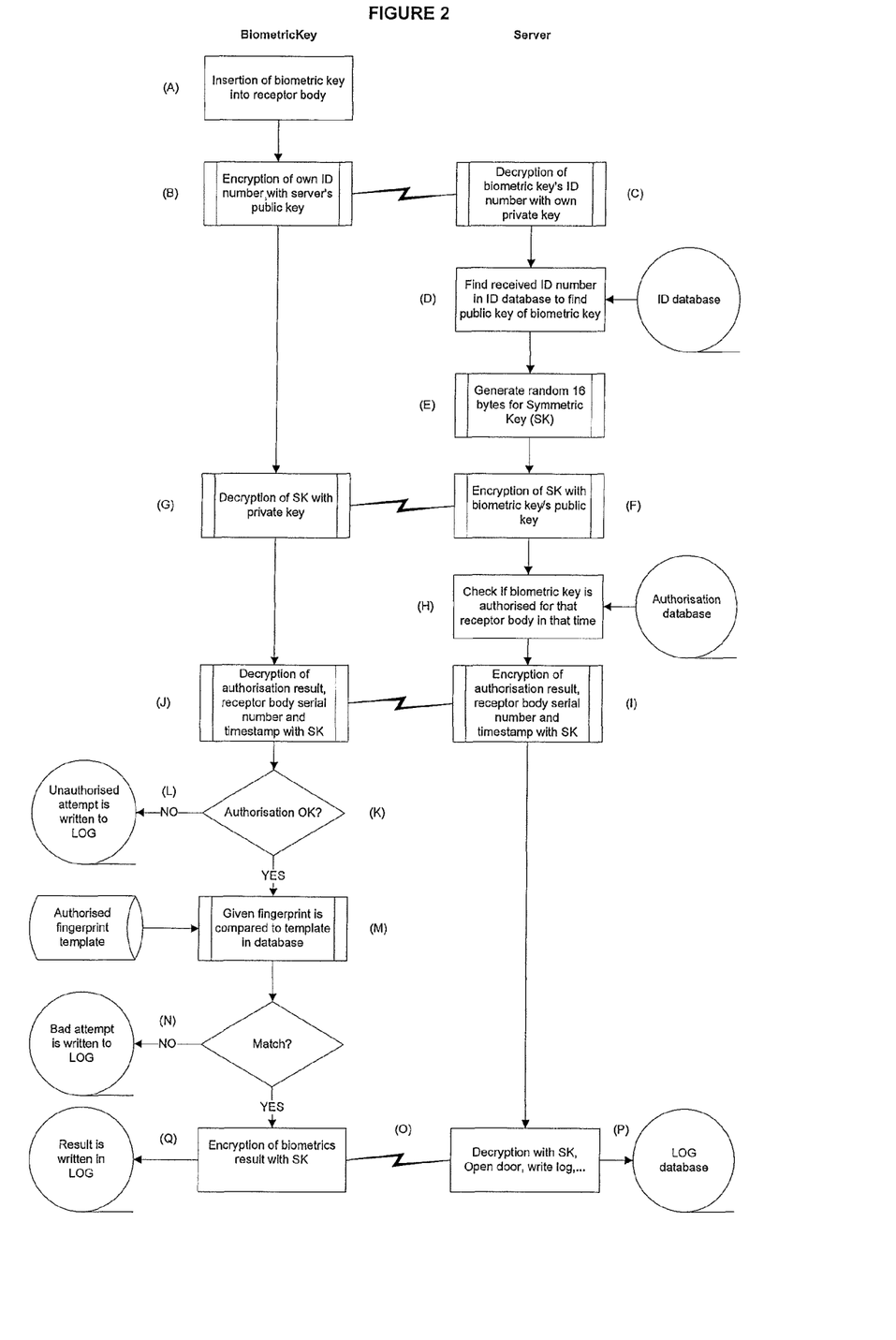
FIGS. 2 and 3 are schematic diagrams illustrative of various applications of the invention.

Step (B) concerns encryption of the identification number of the biometric key which may be associated with a user of the biometric key or which alternatively may be a particular number associated with production of a number of biometric keys at the same time. Encryption takes place with the server's public key. Examples of types of cryptographic algorithms are discussed in "An Overview of Cryptography" by Gary C Kessler described at www.garykessler.net/library/crypto.html.

Step (C) concerns decryption of the biometric key's serial number with the private key of the server. This may occur for example with GnU using PHP as discussed at hxxp://devzone.zend.com/article/1265. Other suitable decryption techniques may also be used.

Step (D) concerns a search of the ID database of the server to locate or identify the public key of the biometric key.

Step (E) concerns generation of a random 16 bytes for the symmetric key ("SK") code using a suitable algorithm as discussed for example at ieeexplore.ieee.org/xpls/abs_alljsp?arnumber=5233985 or portal.acm.org/citation.cFm?id=20199—similar.

Step (F) concerns encryption of the SK with the public key of the biometric key using techniques as discussed above.

Step (G) concerns decryption of the SK with the private key of the biometric key.

Step (H) concerns a check of the authorisation database of the server to determine if the biometric key is authorised for a particular location at a particular time.

Step (I) concerns encryption of the authorisation result and also location of the ID and timestamp with the SK.

Step (J) refers to decryption of the authorisation result location of the ID and timestamp with the SK.

Step (K) concerns a check of the database of the biometric key to assess whether the authorisation is OK or unauthorised. If NO, Step (L) ensures that the unauthorised attempt is recorded in the LOG of the biometric key.

Step (M) refers to a YES and thus a particular biocode or given fingerprint is compared to a template in the database of the biometric key. If a match does not occur as shown at step (N) then this is recorded in the LOG. If however a match does occur at step (M) the result is encrypted with SK and sent to the server for decryption as per step (O) whereby access to the facility such as a door is provided wherein the door is opened. This is recorded in the LOG of the server as per step (P) and the fact that a match has occurred in recorded in the LOG of the biometric key as per step (Q).

Figure 3:
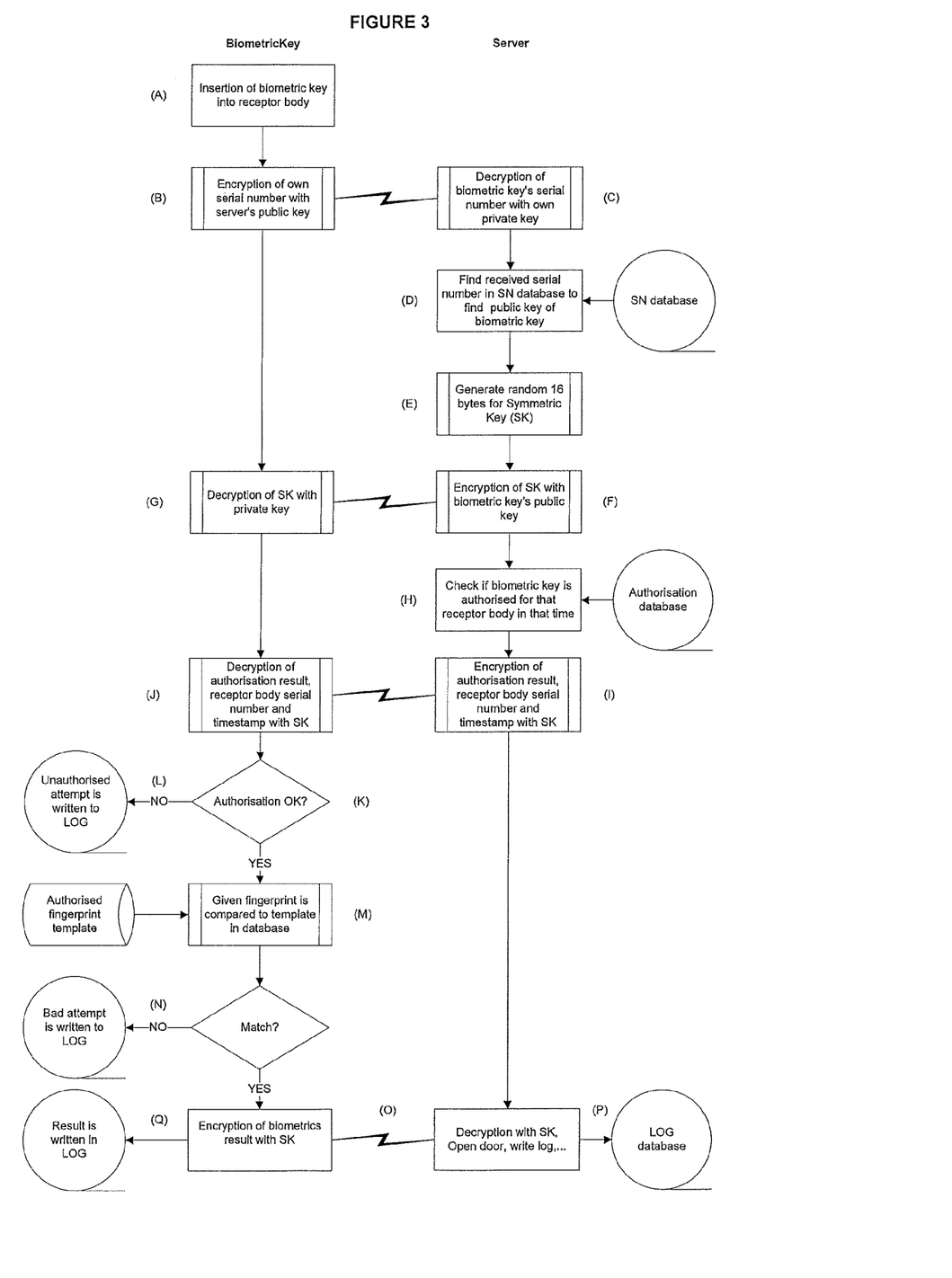

In relation to FIG. 3 this has reference to a variation of step (iv) described above where the serial number of the biometric key is used rather than the identification number. This means that steps (A), (B), (C) and (D) are changed compared to FIG. 2 as set out in FIG. 3.

It will also be appreciated that asymmetric encryption may be used for generation of the security code but symmetrical encryption is preferred which is faster and more efficient. Thus for example, asymmetric encryption can be used to obtain the identification number of the biometric key and subsequently the server can generate an asymmetric key. From this point onwards it is preferred to use symmetrical encryption.

It will also be appreciated that different authorisations can be assigned at different levels i.e. at a production level and project level as well as door unit authorisation, desktop unit authorisation, biometric key authorisation unit authorisation and biometric key user authorisation. This is set out in more detail below.

1. Production or Manufacture Level

During the production level a serial number is assigned to each unit as well as the biometric key. The serial number may be 16 bytes long and is stored in EEPROM of each unit and the biometric key and in a central database or in a system application on the server.

Also during production, every active pair (i.e. the biometric key and each of the units described above) may be equipped with its own private key and public key security pair.

2. Project Level

At this level, we prepare central application server together with relevant software. This corresponds to step (A) in FIG. 4. When everything is ready, one biometric key authorisation unit and one biometric key are authorised to the system—a biometric key for example can be assigned to the person who will do the system installation at the customer side.

3. Door Authorisation

Every security door can have two cylinders i.e. usually one cylinder is adjacent a user and another cylinder is remote from the user on the other side of the door. Each cylinder will operate unlocking or locking of the door independently. Thus the adjacent cylinder can be termed cylinder 1 and the remote cylinder can be termed cylinder 2. The same numbering can be used for LCDs i.e. LCD1 is adjacent cylinder 1 and LCD2 is adjacent cylinder 2.

At door unit authorisation a new pair of public/private keys is generated and in system application serial numbers of the door unit and attached LCDs are written in the central application server. There is thus a record of all usage of cylinders and locks so maintenance time can be predicted.

3.1 Desktop Unit Authorisation

At desktop unit authorisation, a new pair of public/private keys is generated and in system application serial number of the desktop unit is written in the central application server.

3.2 Biometric Key Authorisation Unit Authorisation

There can be additional biometric key authorisation units installed and authorised at installation level.

At biometric key authorisation unit authorisation, a new pair of public/private keys are generated and in system application serial numbers of biometric keys authorisation unit and attached LCD are written.

3.3 Biometric Key User Enrolment or Authorisation

Figure 4:
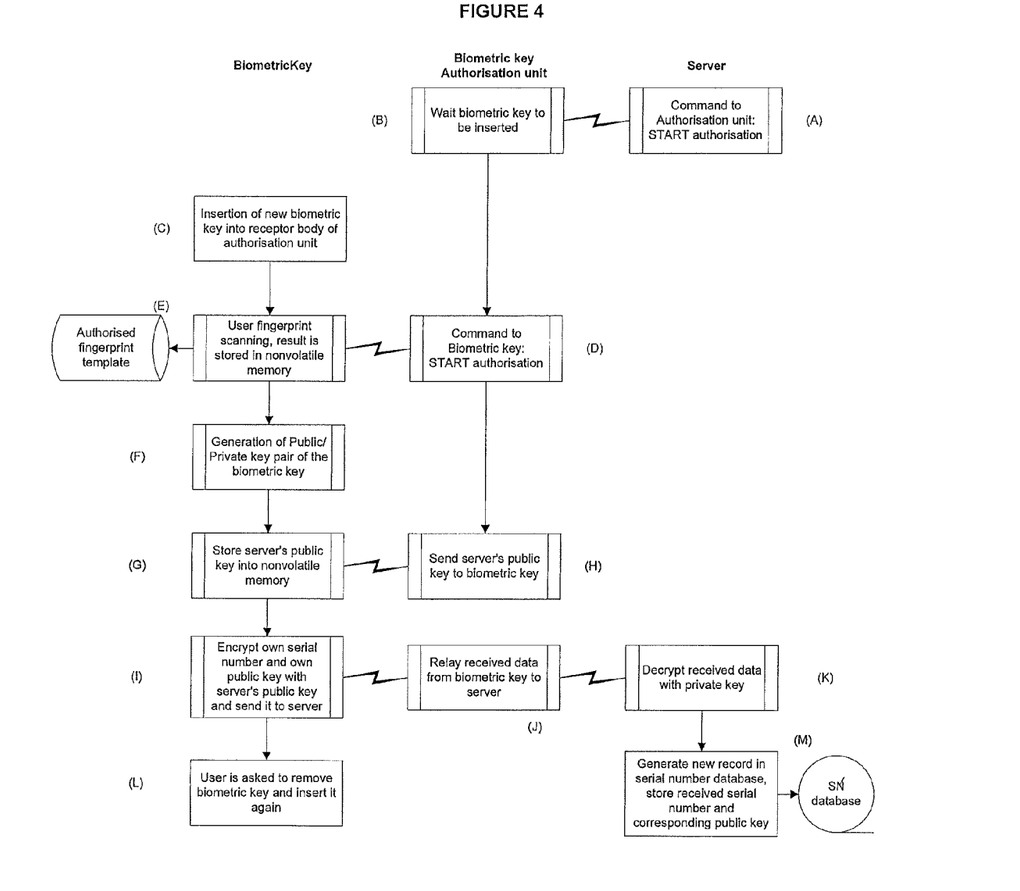
FIGS. 4-5 are schematic diagrams illustrating the various authorisation steps of the biometric key and receptor body.

At this step the Serial Number of the Biometric key (16 byte) is written into system application and user fingerprint is stored into the non-volatile memory in the biometric key as illustrated in step (E) of FIG. 4 referred to hereinafter. This follows the insertion of the key into the biometric key authorisation unit as per steps (A), (B) and (C). Next, a pair of public/private keys is generated as per step (F) of FIG. 4 after the START command has been initiated in step (D). Next the biometric key's public key is sent to the server via the biometric key authorisation unit and the server's public key is sent to the biometric key as per steps (G), (H), (I), (J) and (K) of FIG. 4. This procedure is tested as per step (L) and a new record is generated in the serial number database as per step (M).

In regard to the above mentioned biometric key, initial authorisation of a particular user is recorded in the biometric key upon receiving the appropriate biocode. This is done by scanning a fingerprint for example of a user and stored as a biocode in the biometric key. This is then stored into the EEPROM which is one example of a nonvolatile memory of the biometric key so that only the biocode of this authorised user will be responsible for use of the biometric key in regard to any of the units described above. This is useful as an additional security precaution as only the authorised biocode can be recorded in the biometric key.

In relation to FIG. 4 it will be appreciated that steps (A) and (B) are the initial steps of the authorisation or enrolment process with an initial command from the server to the biometric key authorisation unit which is awaiting for the biometric key to be inserted therein which subsequently follows as per step (C). This is followed by recordal of the user's fingerprint in the biometric key which may occur by scanning as described above. The fingerprint is then stored in the EEPROM of the biometric key as part of the authorised fingerprint database or template as per step (D). The storage of the authorised fingerprint follows step (D) which is a command from the server to start the authorisation or enrolment procedure set out in FIG. 4 in steps (A), (B), (C) and (D) of a particular user.

Subsequently a security pair of public key and private key of the biometric key is generated in step (F) and the servers public key is stored in the EEPROM or nonvolatile memory of the biometric key after being sent from the server as per steps (G) and (H). This is followed by encryption of the serial number and the public key of the biometric key which is sent to the server for decryption in accordance with steps (I) and (J). Subsequently a new record is generated in the server in relation to the SN database in step (K) wherein the received serial number and corresponding public key of the biometric key is stored.

Figure 5:
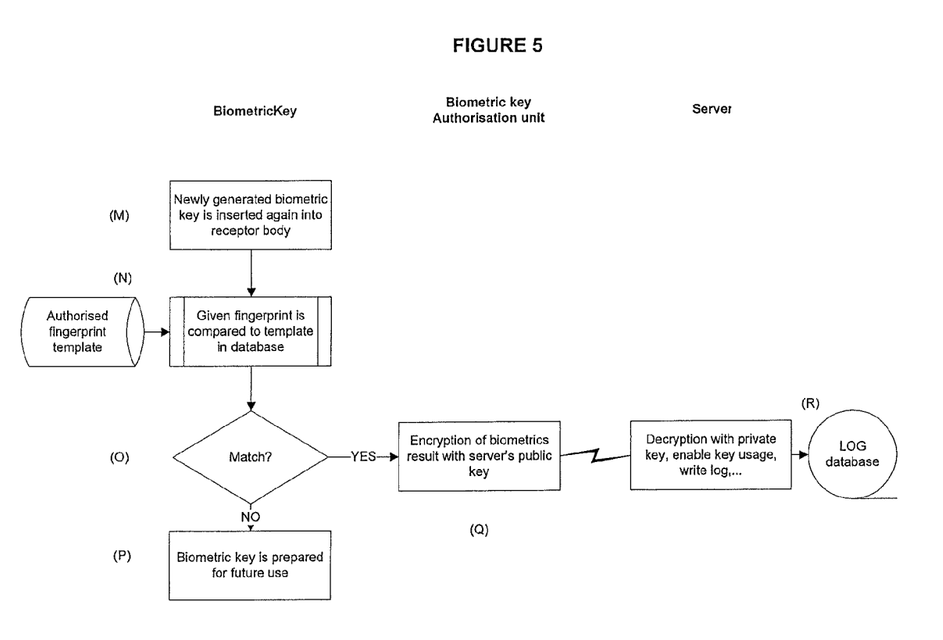

Following the enrollment procedure as described above and generation of the SN database in the server, the user is requested to insert the newly generated biometric key into an appropriate receptor body where after scanning of the user's fingerprint and a comparison is made with the authorised user database in the biometric key as per steps (M) and (N) of FIG. 5 if a match is made as per steps (O), (Q) and (R) and following encryption and decryption of the server's public key with the biometrics result a YES is written into the LOG database of the server. If NO, as per step (P) the biometric key is prevented from future use.

In regard to the communication method of the invention as described above it will be appreciated that if an attempt was made to break into the system the only information that would be accessible would be the identification of the biometric key encrypted with the public key of the server and thus such information would be totally useless in regard to obtaining access to the facility accessible by the server.

It will also be appreciated that when the new symmetrical key is made available to the biometric key no one will be able to break the code as the new symmetrical key is selected on a purely random basis and encoded with the biometric key's public key so that the only person who can decode the symmetrical key will be the biometric key with its own private key. Thus it is impossible to break into messages between the server and the biometric key.

Also it will be appreciated that since all messages are encrypted with symmetrical encryption no one can access such messages. Thus for example the symmetrical key can be 16 bytes long and different for every session. This means that even a simple message such as "yes you can open the door" encrypted with a different symmetrical code will make each message totally different.

It will also be appreciated from the foregoing that production of the biometric key is very simple and thus when they become keys that can be utilised at the point of authorisation where they generate their own public/private key and receive the public key of the server as well as fingerprint data associated with the user.

Thus in establishment of this communication system it will be appreciated that it can be done in a very simple and efficient manner. It is important to stress that all biometric keys become real keys at the point of authorisation when they generate their own public/private key and receive server's public key plus user fingerprint data.

In relation to PKI it is useful to use Elliptic curve cryptography (hxxp://en.wilipedia.org/wiki/Elliptic_curve_cryptography) and for SK AES may be used (hxxp://en.wilipedia.org/wiki/Advanced_Encryption_Standard).

The claims defining the invention are as follows:

1. A method for providing access to a facility including the following steps:
    (i) making electrical connection between a biometric key and a receptor body thereby making communication with a server wherein the biometric key has a public key and a private key and the server also has a public key and a private key wherein the server will identify the biometric key upon making such electrical connection whereby said receptor body provides electrical power to the biometric key and which simultaneously activates a biometric sensor located in the biometric key;
    (ii) establishing a secure communication path between the biometric key and the server, wherein (a) all messages between the server and the biometric key will be encrypted with the biometric key's public key and sent to the biometric key for decryption by the private key of the biometric key and (b) all messages between the biometric key and the server will be encrypted with the server's public key and sent to the server for decryption by the server's private key, wherein (a) and (b) are based on generation of a randomly based symmetric key and each message is unique; and
    (iii) establishing using the secure communication path and procedure in step (ii) that the biometric key is authorized to use the receptor body by comparison between a biocode of a user of the biometric key with a database located in the biometric key and if a match is obtained to generate an authorized biometric signature whereby a communication from the biometric key using the secure communication path and procedure in step (ii) will be sent to the server wherein access to the facility will be provided whereby during steps (i), (ii) and (iii) said authorized biometric signature is not transferred to any external computer or processor,
    wherein during step (i) identification of the biometric key is obtained by forwarding a unique identification number ("ID") or a unique serial number of the biometric key to the server using the secure communication path and procedure of step (ii) whereby encryption of the ID number or serial number occurs with the public key of the server and decryption of the ID number or serial number occurs with the private key of the biometric key wherein said ID number or serial number is checked using an ID number or serial number database associated with the server.

2. The method as claimed in claim 1, wherein in relation to step (ii) there are different authorizations assigned at different levels so that a user can only use a receptor body authorized at an appropriate level.

3. The method as claimed in claim 2, wherein said different levels of authorizations involve the use of receptor bodies including a door unit, a desktop unit or biometric key authorization unit.

4. The method as claimed in claim 1, wherein after location of the identification number, the public key of the biometric key is generated and subsequently said public key of the biometric key is encrypted with the symmetric key.

5. The method as claimed in claim 1, wherein after location of the serial number of the biometric key, the public key of the biometric key is generated and subsequently said public key of the biometric key is encrypted with the symmetric key.

6. The method as claimed in claim 1, wherein a biometric sensor is used in enrolment of a user's fingerprint in the database of the biometric key wherein said user's fingerprint is scanned by the biometric sensor and stored as a biocode in a non-volatile memory of the biometric key.

7. The method as claimed in claim 1, wherein during manufacture of the biometric key a serial number is assigned to the receptor body as well as the biometric key and also the public key and private key for the biometric key is also generated as well as a public key and private key for the receptor body.

8. The method as claimed in claim 7, wherein a serial number and public key and private key of a plurality of receptor bodies is generated.

9. A communication method including the following steps:
(i) making electrical connection between a biometric key and a receptor body thereby making communication with a server wherein the biometric key has a public key and a private key and the server also has a public key and a private key wherein the server will identify the biometric key upon making such electrical connection;
(ii) establishing a secure communication path between the biometric key and the server wherein (a) all messages between the server and the biometric key will be encrypted with the biometric key's public key and sent to the biometric key for decryption by the private key of the biometric key and (b) all messages between the biometric key and the server will be encrypted with the server's public key and sent to the server for decryption by the server's private key wherein (a) and (b) are based on generation of a randomly based symmetric key and each message is unique;
(iii) establishing using the secure communication path and procedure in step (ii) that the biometric key is authorized to use the receptor body and if such authorization is present a biocode of a user of the biometric key will subsequently be compared to a database located in the biometric key and if a match is obtained a communication from the biometric key using the secure communication path and procedure in step (ii) will be sent to the server or receptor body wherein access to a facility accessible by the server or receptor body will be provided,
wherein step (iii) takes place by the server checking the authority of the biometric key or facility and if there is no authority the server will encrypt a resulting NO message with the symmetrical key and send a resultant communication to the biometric key for decryption by the symmetrical key for ultimate recordal in the biometric key as to time and serial number of the receptor body.

10. A communication method between a biometric key and a server which includes the following steps:
(i) making electrical connection between a biometric key as described above having a biometric sensor and a receptor body thereby making communication with a server wherein the biometric key has a public key and a private key and the server also has a public key and a private key wherein the server will identify the biometric key upon making such electrical connection;
(ii) establishing a secure communication path for communication between the biometric key and the server wherein said (a) all messages between the server and the biometric key will be encrypted with the biometric key's public key and sent to the biometric key for decryption by the private key of the biometric key and said (b) all messages between the biometric key and the server will be encrypted with the server's public key and sent to the server for decryption by the server's private key, wherein a biometric sensor is used for enrolment of a user's fingerprint in an authorized template or database of the biometric key wherein said user's fingerprint is scanned by the biometric sensor and stored as a biocode in a non-volatile memory of the biometric key and thereafter a secure pair of the public key and private key of the biometric key is generated wherein the public key of the server is stored in the non-volatile memory of the biometric key and subsequently a serial number of the biometric key and the public key of the biometric key is encrypted which is then sent to the server for decryption wherein subsequently the serial number and corresponding public key of the biometric key is stored;
(iii) establishing using the secure communication path and procedure in step (ii) that the biometric key is authorized to access a facility or to use the receptor body and if such authorization is present a biocode such as a fingerprint of a user of the biometric key will subsequently be compared to a database located in the biometric key and if a match is obtained a communication from the biometric key using the secure communication path and procedure in step (ii) will be sent to the server wherein access to a facility accessible by the server will be provided, and
wherein step (iii) takes place by the server checking the authority of the biometric key in regard to the receptor body or a facility and if such authority is present the server will encrypt a resulting YES message with a randomly based symmetric key and forward a resultant communication to the biometric key for decryption by the symmetric key for ultimate recordal by the biometric key as to time and a serial number of the receptor body.

11. The method as claimed in claim 10, wherein after receipt of the authority the biometric key after a period of time or waiting will verify the fingerprint or other biometric signature associated with the user and a resulting YES/NO communication encrypted with the symmetrical key will be sent to the server for decryption by the symmetrical key and a time and serial number of the facility or receptor body will also be recorded in the biometrical key and the server and subsequently the facility will be accessed by the user of the biometric key.

12. A communication method including the following steps:
(i) making electrical connection between a biometric key and a receptor body thereby making communication with a server wherein the biometric key has a public key and a private key and the server also has a public key and a private key wherein the server will identify the biometric key upon making such electrical connection;

(ii) establishing a secure communication path between the biometric key and the server wherein said (a) all messages between the server and the biometric key will be encrypted with the biometric key's public key and sent to the biometric key for decryption by the private key of the biometric key and said (b) all messages between the biometric key and the server will be encrypted with the server's public key and sent to the server for decryption by the servers' private key
wherein a biometric sensor is used for enrolment of a user's fingerprint in an authorized template or database of the biometric key wherein said user's fingerprint is scanned by the biometric sensor and stored as a biocode in a non-volatile memory of the biometric key and thereafter a secure pair of the public key and private key of the biometric key is generated wherein the public key of the server is stored in the nonvolatile memory of the biometric key and subsequently a serial number of the biometric key and the public key of the biometric key is encrypted which is then sent to the server for decryption wherein subsequently the serial number and corresponding public key of the biometric key is stored;
(iii) establishing using the secure communication path and procedure in step (ii) that the biometric key is authorized to use the receptor body and if such authorization is present a biocode of a user of the biometric key will subsequently be compared to a database located in the biometric key and if a match is obtained a communication from the biometric key using the secure communication path and procedure in step (ii) will be sent to the server or receptor body wherein access to a facility accessible by the server or receptor body will be provided,
wherein a biometric sensor is used for enrolment of a user's fingerprint in an authorized template or database of the biometric key
wherein said user's fingerprint is scanned by the biometric sensor and stored as a biocode in a non-volatile memory of the biometric key and thereafter a secure pair of the public key and private key of the biometric key is generated
wherein the public key of the server is stored in the non-volatile memory of the biometric key and subsequently a serial number of the biometric key and the public key of the biometric key is encrypted which is then sent to the server for decryption wherein subsequently the serial number and corresponding public key of the biometric key is stored.

* * * * *